Jan. 22, 1957     L. SZILARD     2,778,792
METHOD FOR UNLOADING REACTORS
Filed April 19, 1946     5 Sheets-Sheet 3

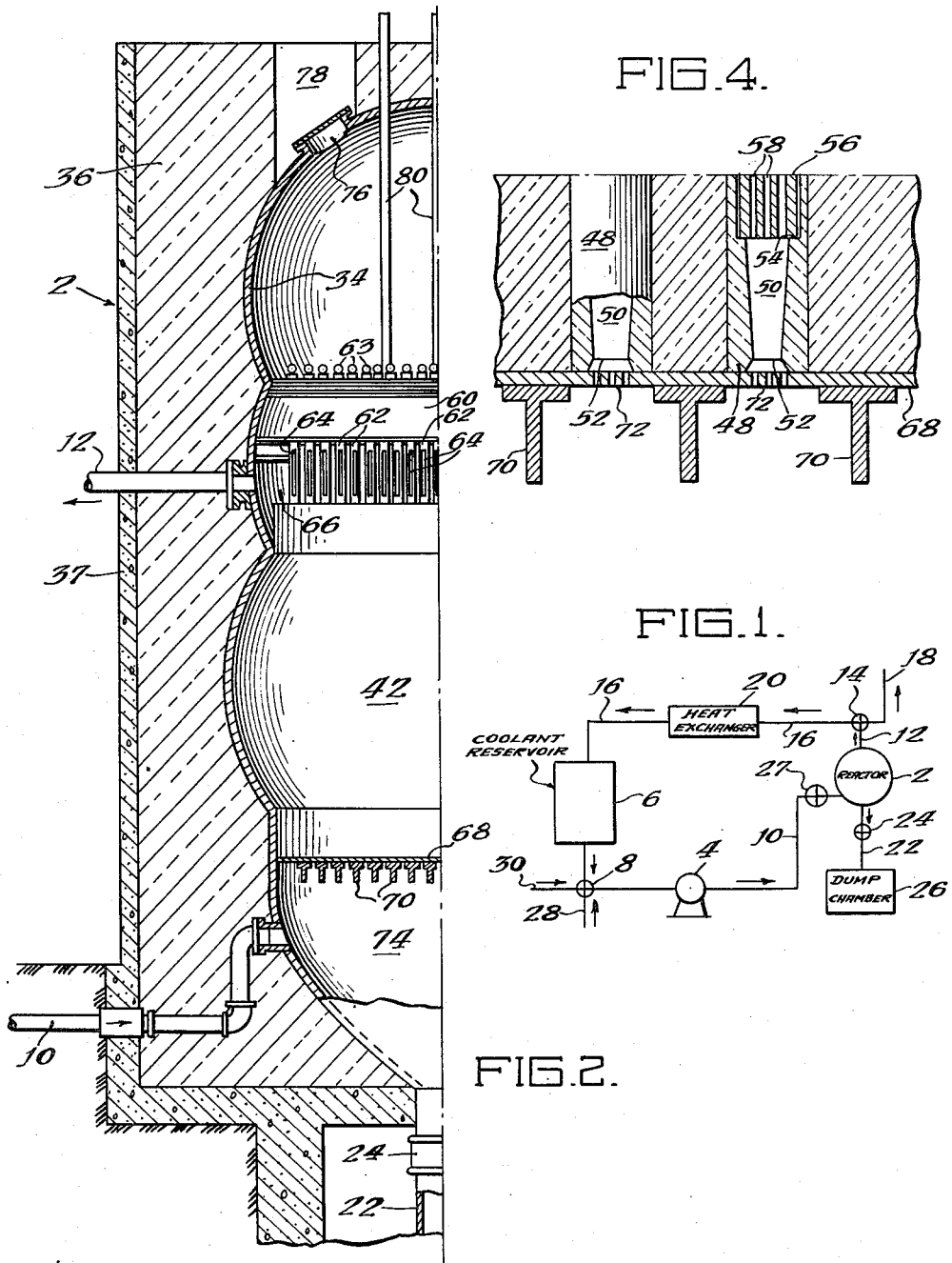

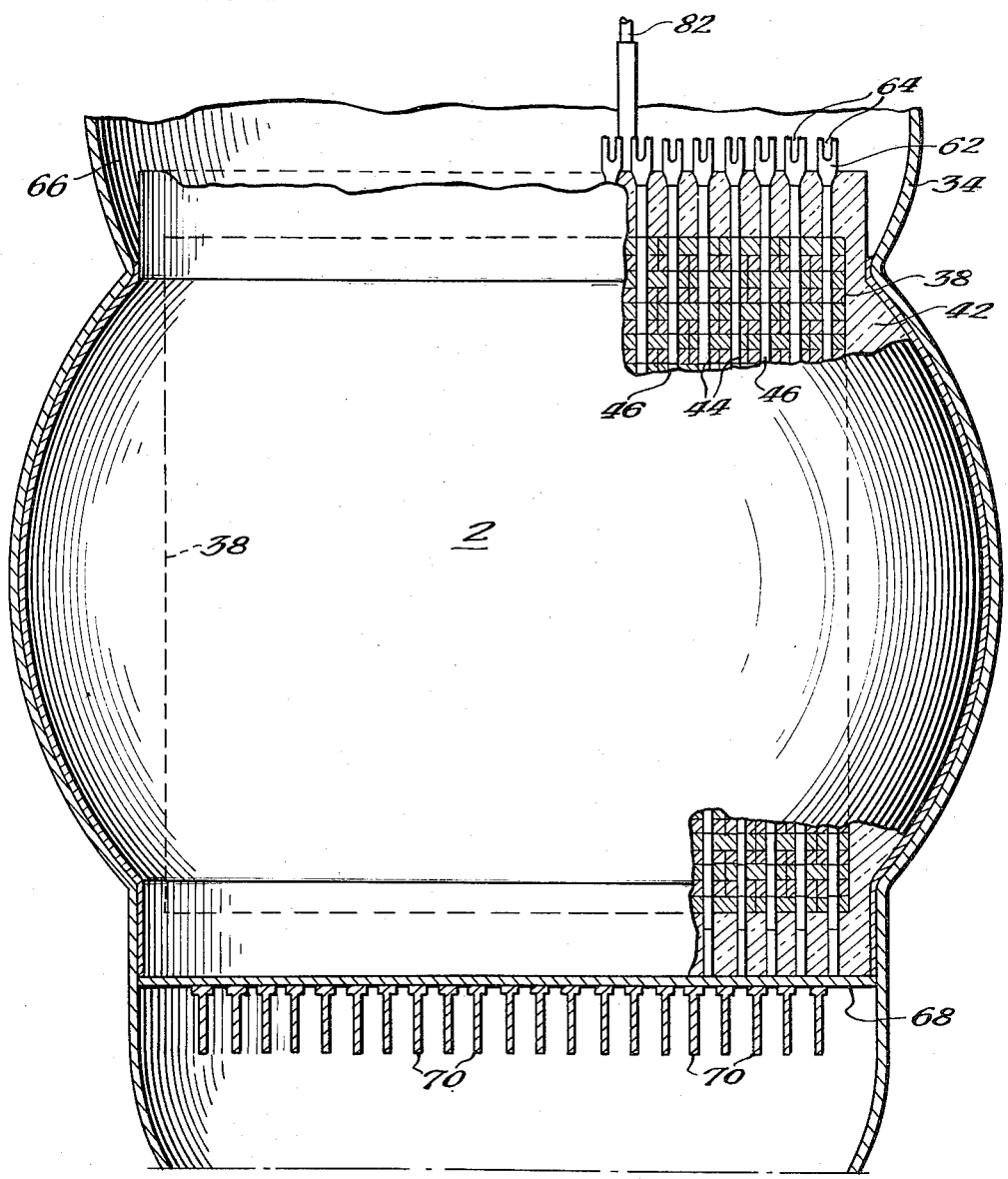

Witnesses:
Herbert E. Metcalf
Walter L. Schlegel, Jr.

Inventor:
Leo Szilard
By: Robert A. [Attorney signature]
Attorney

Jan. 22, 1957 L. SZILARD 2,778,792
METHOD FOR UNLOADING REACTORS
Filed April 19, 1946 5 Sheets-Sheet 5

Witnesses:
Herbert E. Metcalf
Walter L. Schlegel, Jr.

Inventor:
Leo Szilard
By Robert K. ...
Attorney.

United States Patent Office 2,778,792
Patented Jan. 22, 1957

2,778,792

METHOD FOR UNLOADING REACTORS

Leo Szilard, Chicago, Ill., assignor to the United States of America as represented by the United States Atomic Energy Commission Application April 19, 1946, Serial No. 663,452

1 Claim. (Cl. 204—154)

This invention relates to neutronic reactors and more particularly to a novel method for removing the fissionable material from such a reactor whereby said material may be treated to recover the element 94 and fission products of the reaction.

In neutronic reactors a neutron fissionable isotope such as $U^{233}$, $U^{235}$, or $94^{239}$ or mixtures thereof is subjected to fission by absorption of neutrons, and a self-sustaining chain reaction is established by the neutrons evolved by the fission. In general, such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in U. S. Patent 2,708,656 of Enrico Fermi and Leo Szilard, Serial No. 568,904, filed December 19, 1944.

An object of the invention is to provide a novel method for unloading the fissionable material from a neutronic reactor.

A specific object of the invention is to provide a novel method for unloading the fissionable material from a neutronic reactor and recovering products of fission by dissolving the fissionable material in situ, or in the reactor, and withdrawing the solution from the reactor, thus dispensing with necessity for complicated and expensive apparatus such as heretofore utilized in removing said material from reactors of this type.

A further object of the invention is to provide a novel method for removing fissionable material from a neutronic reactor in which a solvent is continuously pumped therethrough, whereby said material is dissolved and pumped from the reactor.

Other objects and advantages will be apparent from the following description taken with the accompanying drawings, in which:

Fig. 1 is a flow diagram illustrating a preferred embodiment of the invention;

Fig. 2 is a fragmentary vertical sectional view through a neutronic reactor with the reactive composition illustrated in elevation;

Fig. 3 is an enlarged fragmentary vertical sectional view partially in elevation through the reactor shown in Fig. 2;

Fig. 4 is an enlarged fragmentary sectional view in elevation through the lower portion of the reactive composition of the reactor shown in Fig. 2, said view illustrating in detail the construction of the uranium-containing cartridges or units utilized in this embodiment;

Figure 6:
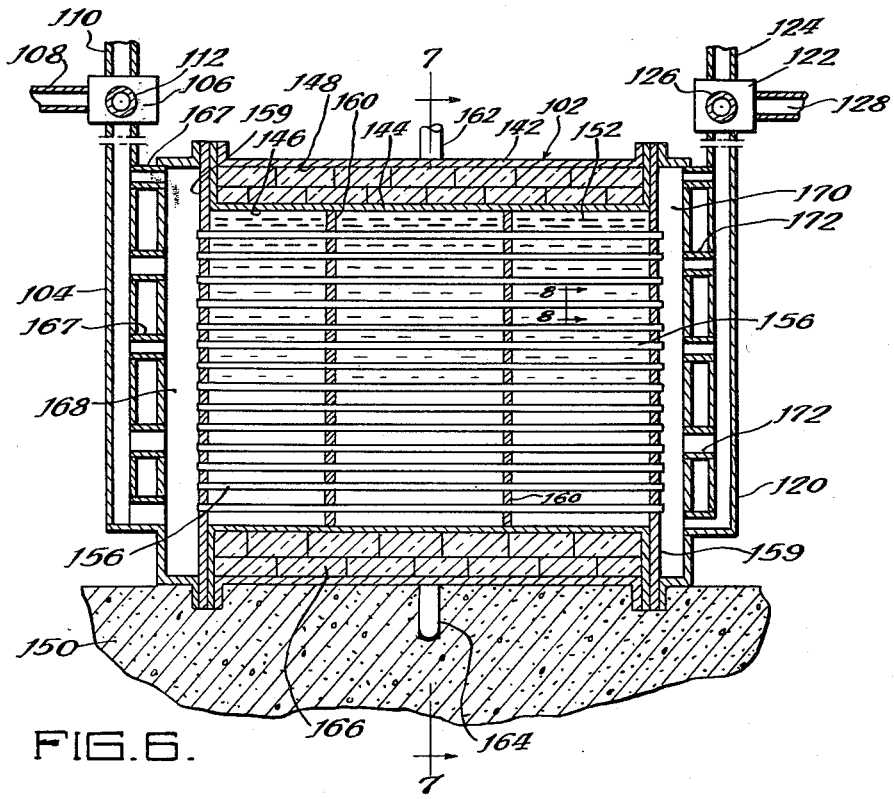
Fig. 6 is a vertical sectional view through a neutronic reactor of the type utilized in the arrangement of Fig. 5, said section being taken approximately in the longitudinal vertical plane indicated by the line 6—6 of Fig. 7, portions of the structure being shown in elevation.

Describing the invention in detail and referring first to Fig. 1, which illustrates diagrammatically a preferred embodiment of the invention, a coolant is circulated through a reactor 2 by a system including a pump 4 having its suction side connected to a coolant reservoir 6 through a conventional three-way operating valve 8. The discharge side of the pump 4 is connected to the reactor 2 through an inlet line 10 which communicates, as is hereinafter described in detail, with passages or ducts extending through neutron moderator such as graphite blocks forming part of the reactor 2. Slugs or units of fissionable material, such as uranium, are dispersed throughout said ducts to form a geometric arrangement hereinafter described and particularly conducive to a nuclear fission chain reaction, as more fully discussed in the above-mentioned U. S. Patent 2,708,656.

The coolant passes from the discharge side of the reactor 2 through an outlet line 12 and a two-way operating valve 14 connected to a coolant outlet line 16 and to an oxidant outlet line 18, said coolant line 16 being equipped with a conventional heat exchanger device 20 comprising conventional means, not shown, for passing a cooling fluid in heat exchange relationship with the coolant passing through the line 16 which is connected to the before-mentioned reservoir 6.

The ducts within the reactor also communicate with a dump line 22 including a drain valve 24, said line communicating with a dump chamber 26 serving a purpose hereinafter described in detail.

Describing briefly an operating cycle of the system shown in Fig. 1, the reactor 2, which is preferably so designed as to operate at a power value of at least $10^6$ kw., is operated at that value for approximately 6 months to produce 94 and fission products. During this period a coolant such as helium having a low neutron capture cross-section is circulated through the reactor 2 by the pump 4, said coolant passing through a normally open shut-off valve 27 in the inlet line 10 and through the reactor 2 into the valve 14 which is so actuated as to direct the coolant through the line 16 into the reservoir 6. Inasmuch as the valve 8, at this stage of the cycle is so actuated as to open reservoir 6 to communication with the suction side of the pump 4, it will be understood that a closed circuit is established through which the coolant is continuously circulated.

After approximately 6 months, the reaction is terminated by control means hereinafter described, and preferably the reactor is thereafter cooled for approximately 1 month by circulating the coolant therethrough, as above described.

At the end of the cooling period, the pump 4 is connected to a solvent line 28 by means of the valve 8, said line being connected to a source (not shown) of a uranium solvent such as nitric acid. The solvent is pumped through the line 10 into the reactor 2, the valve 14 being closed, until the ducts therein are filled whereupon the valve 27 is closed, and a sufficient period of time is allowed to permit the uranium to dissolve. The drain valve 24 is then opened, and the uranium solution is admitted through the line 22 to the dump chamber 26 for storage therein pending treatment of the solution to extract the element 94 and fission products of the reaction.

It will be understood that certain uranium compounds, such as uranium oxide are somewhat more soluble than elemental or metallic uranium, which is preferably used in the reactor as a source of fissionable material to sustain a chain reaction; and, if desired, prior to dissolving the uranium as above described, the uranium metal may be converted to uranium oxide by passing an oxidant such as oxygen through the reactor 2. This is accomplished by actuating the valve 8 to open an oxidant supply line 30 to communication with the suction side of the pump 4, the valve 14 being actuated to open the above-mentioned oxidant outlet line 18 to communication with the outlet line 12. It may be noted that as a result of the neutronic reaction, the fissionable material is, in the absence of a coolant, capable of sustaining a temperature of more than 170° C, at the which uranium will readily oxidize in oxygen or air. Under certain conditions it may be desirable to sustain the neutronic reaction in order to maintain the uranium at its combustion temperature of 170° C. until the oxidation thereof is substantially complete or until the reproduction ratio of the reactor decreases to a value below unity as the result of conversion of the uranium metal to uranium oxide, which as more fully described in the copending application, results in a decrease in the reproduction ratio of the reactor. However, it has been experimentally determined that after the operation of a reactor for the period of 6 months at a power value of $10^6$ kw., the uranium metal will remain at a relatively high temperature for a sufficient period of time to insure susbtantially complete oxidation even though the reaction has terminated before the process of oxidation is initiated. Although the oxidation step is preferably accomplished subsequent to the above-mentioned cooling period, if desired, oxidation may be initiated immediately upon termination of the reaction.

If desired, the uranium metal may be oxidized by passing a mixture of hydrogen and steam (H₂O) through the reactor ducts. The reaction for this process appears to be as follows: the hydrogen reacts with uranium to form uranium hydride according to the following equation:

$$U + \tfrac{3}{2}H_2 \longrightarrow UH_3$$

Uranium hydride reacts with steam to form uranium oxide according to the following equation:

$$UH_3 + 2H_2O \longrightarrow \tfrac{7}{2}H_2 + UO_2$$

A coating of uranium oxide is thus formed on the uranium metal, and this coating is penetrated by the hydrogen to form more uranium hydride therebeneath. The uranium hydride increases in volume thereby cracking the uranium oxide coating and exposing the uranium hydride therebeneath to the action of steam thus producing more uranium oxide. If the uranium is contained within an aluminum jacket, such as hereinafter described, the aluminum is rapidly oxidized by susbtantially the same reactions as that set forth above.

Another method of converting the uranium to a readily soluble compound is by passing a mixture of hydrogen and hydrogen sulphide through the reactor ducts. The reactions of this process appear to be the same as that set forth except that the uranium hydride reacts with the hydrogen sulphide to form uranium sulphide in accordance with the following equation:

$$UH_3 + 3H_2S \longrightarrow U_2S_3 + \tfrac{9H_2}{2}$$

Uranium sulphide is readily soluble in nitric acid.

Also, if desired, in substitution for the oxidation step, the uranium may be converted to uranium chloride by passing a mixture of hydrogen and vaporized hydrogen chloride through the reactor ducts. The reactions for this reaction appears to be as follows:
the uranium metal reacts with hydrogen to form uranium hydride, as above described, and the latter reacts with the vaporized hydrogen chloride to form uranium chloride in accordance with the following equation:

$$UH_3 + 3HCl \rightarrow UCl_3 + 3H_2$$

The uranium chloride is readily soluble in ordinary water which may be substituted for nitric acid as a solvent.

Referring now to Figs. 2 to 4, inclusive, wherein one reactor 2 is illustrated in considerable detail, it will be seen that the reactor 2 comprises a tank or a chamber 34 preferably constructed of a relatively strong but neutron permeable material such as stainless steel, said tank 34 being contained within a shield 36 (Fig. 2) of refractory material such as commercial graphite. The shield 36 is contained within a concrete vault or chamber 37 and is adapted to absorb emanations such as neutrons, alpha, beta and gamma rays and heat generated by the reactor.

Within the tank 34 is a cube 38 (Fig. 3) of neutron moderator material such as neutronically pure beryllium or graphite in the form of blocks of said material, and around the cube 38 is a neutron reflector 42 formed of an efficient reflecting material such as a neutronically pure graphite, said reflector 42 functioning to reflect neutrons escaping from the periphery of the cube 38 back into the latter, thereby decreasing the size at which the reactor is effective to produce a self-sustaining nuclear fission chain reaction. Thus, the reactive composition is capable of sustaining a chain reaction even through the reactor is considerably smaller than the critical size at which the particular geometry would normally be effective to sustain a chain reaction in the absence of a reflector.

The cube 38 is pierced with vertical ducts or channels 44 (Fig. 3), each containing a column 46 composed of a plurality of vertically aligned cartridges, two of which are illustrated at 48 in Fig. 4, wherein it may be seen that each cartridge 48 is a hollow graphite member with a central vertical passage 50 tapering at one end thereof to form a constriction or throat 52 adapted to restrict the flow of coolant flowing through said passage 50. The passage 50 adjacent its upper end is enlarged to provide an annular seat 54 (Fig. 4, right) for a uranium slug or unit 56 which is provided with a plurality of vertical passages or channels 58 to accommodate the passage of fluid therethrough.

Above the reflector 42 and spaced therefrom is a bulkhead or shield 60 (Fig. 2) preferably composed of graphite and iron, said shield being adapted to absorb emanations from the cube 38 and affording a convenient support for guide tubes 62, each extending into one of the ducts 44 to facilitate the insertion therein of the cartridges 48. Each tube 62 is slotted at 64 to afford fluid outlets communicating with an outlet chamber 66 between the reflector 42 and the shield 60, said outlet chamber 66 communicating with the before-mentioned outlet line 12. The tubes 62 are closed at their upper ends by removable plugs 63 (Fig. 2).

The reflector 42 as well as the columns 46 within the cube 38 are supported at their lower extremities by a partition or wall 68 preferably formed of stainless steel, said wall in turn being supported by spaced T-section beams 70. The wall 68 is provided with a plurality of openings or passages 72 (Fig. 4) communicating with the passage 50 of each bottom cartridge 48.

Thus, fluid circulated through the reactor 2, as above described, first passes from the inlet line 10 into an inlet chamber 74 at the bottom of tank 34 and thence upwardly through the passages 72 and the passages 50, and outwardly through the slots 64 into the outlet chamber 66, and thence outwardly from the reactor 2 through the outlet line 12.

It may be noted that Fig. 2 also illustrates the manner in which the dump line 22 communicates with the bottom of the inlet chamber 74, said dump line 22 serving a purpose heretofore described.

A manhole 76 is provided in the top of the tank 34 and communicates with a passage 78 through the shield 36, whereby operating personnel may enter the tank 34 to insert the cartridges 48 into the guide tubes 62.

The reaction is controlled by one or more control rods 82, more fully described in copending application Serial No. 578,278, filed February 16, 1945, in the joint names of Fermi and Leverett, said copending application describing in more detail a reactor constructed generally as shown in Figs. 2 to 4.

Referring now to Figs. 5 to 10, inclusive, the invention is illustrated as applied to a neutronic reactor, hereinafter described, comprising broadly a plurality of stainless steel tubes suspended within a liquid neutron moderator, such as heavy water, said rods containing fissionable material preferably in the form of elongated uranium rods. Describing this system in detail and referring first to Fig. 5, the reactor diagrammatically indicated at 102 is connected to a fluid inlet line 104 having a conventional three-way operating valve 106. The operating valve 106 is connected to a coolant supply line 108, an oxidant supply line 110, and a solvent supply line 112. The supply line 110 includes a pump or blower 114 having its suction side connected to a suitable source of oxidant such as an oxygen tank (not shown), and the supply line 112 comprises a pump 116 having its suction side connected to a suitable source (not shown) of solvent, such as nitric acid with or without mercury added thereto as hereinafter discussed.

The coolant supply line 108 includes a pump 118 having its suction side connected to a tank or reservoir 119 of fluid coolant, such as helium, said line 108 being connected through valve 106 to the fluid inlet line 104 of the reactor. The reactor 102 is provided with an outlet line 120 including a conventional three-way operating valve 122 connected to an oxygen outlet line 124, a solvent outlet line 126 and a coolant outlet line 128, the last named including a pump 130 having its discharge side connected to a conventional heat exchanger 132. The coolant passes from the exchanger 132 through a conventional purifier 134 and thence into the beforementioned reservoir 119.

Figure 5:
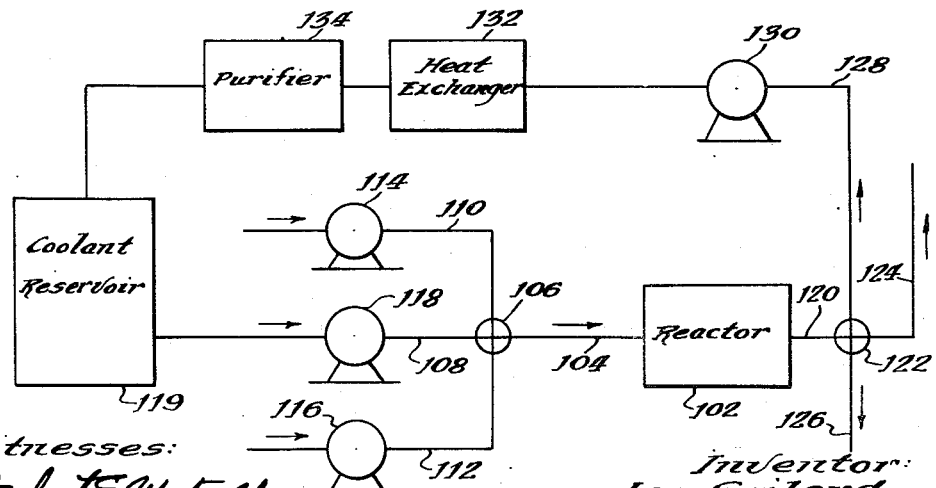
Fig. 5 is a flow diagram illustrating the invention applied to a different type neutronic reactor wherein the reactive composition comprises fissionable material suspended in stainless tubes extending through a heavy water moderator.

Describing briefly an operating cycle of the apparatus diagrammatically illustrated in Fig. 5, it will be noted that the reactor 102 is preferably constructed to operate at a value of at least approximately $10^6$ kw., said reactor being hereinafter described in detail. The reactor 102 is preferably operated at the above-mentioned power value for approximately 6 months during which time the valves 106 and 122 are actuated to accommodate circulation of coolant through the reactor 102 by the before-mentioned pumps 118 and 130, said coolant passing through fluid-tight conduits or tubes within which the fissionable material is supported within the reactor 102 in spaced relationship to the neutron moderator, as hereinafter described in detail.

After approximately 6 months, the neutronic reaction is terminated and the coolant is preferably pumped through the reactor for approximately 1 month thereafter in order to prevent damage to the device as the result of excessive temperatures due to the presence of radioactive short-lived fission products of the reaction. At the termination of this 1 month cooling period, the valves 106 and 122 are actuated to connect the solvent inlet and outlet lines 112 and 126 to the lines 104 and 120, respectively, whereupon the pump 116 is operable to urge the uranium solvent through the reactor conduits thereby dissolving the uranium-containing material therein which is preferably in the form of elemental or metallic uranium, the solution being pumped into a storage tank (not shown).

Under certain conditions, as above discussed, it may be desirable to convert the metallic uranium to uranium oxide inasmuch as the latter is more soluble than uranium metal; and this oxidation process is accomplished prior to dissolving the uranium by actuating the valves 106 and 122 so that the oxidant inlet and outlet lines 110 and 124 are connected respectively to the reactor inlet and outlet lines 104 and 120, whereupon the pump 114 is operable to urge the oxygen through the reactor conduits.

It will be noted that any suitable oxidant such as those described in connection with Figs. 1 to 4 may be utilized in the system under discussion; and also, if desired, the uranium may be converted to a soluble compound such as uranium sulphide or chloride as above described, uranium sulphide being soluble in nitric acid and uranium chloride being soluble in ordinary water.

Figure 7:
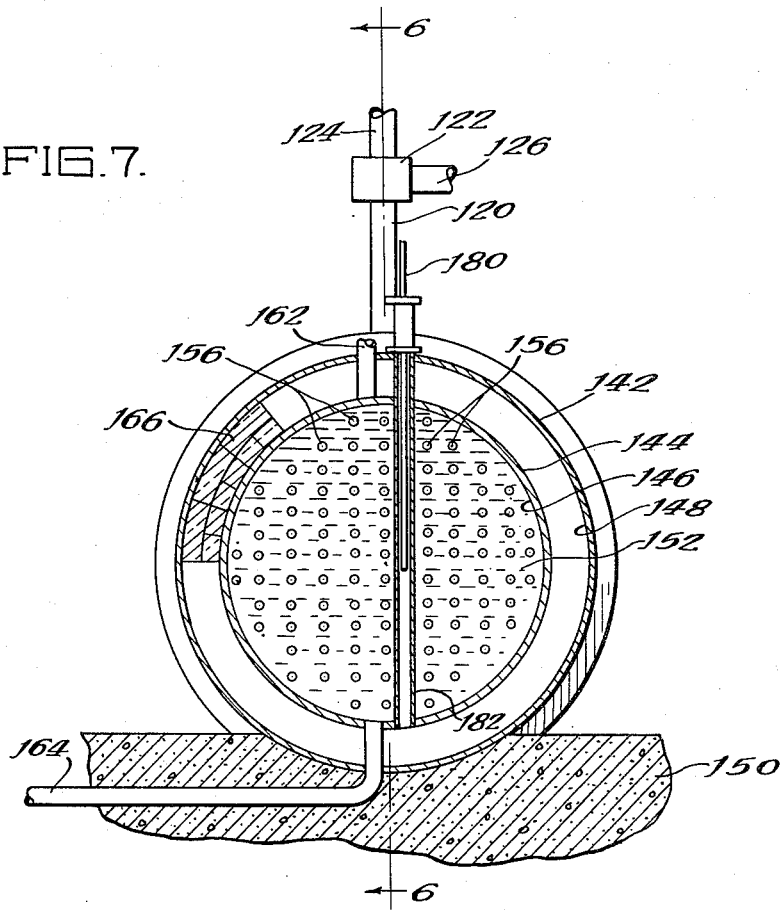
Fig. 7 is a sectional view taken in the transverse vertical plane indicated by the line 7—7 of Fig. 6.
Figure 8:
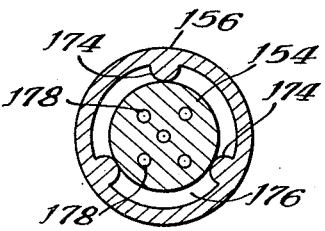
Fig. 8 is a sectional view through one of the uranium-carrying steel tubes shown in Figs. 6 and 7, said view being taken in the plane indicated by the line 8—8 of Fig. 6.

Referring now to Figs. 6 to 8, inclusive, wherein the reactor 102 is illustrated in detail, it will be seen that said reactor comprises a tank 142 preferably of stainless steel and divided by a partition or wall 144 into inner and outer chambers 146 and 148, said wall 144 being preferably formed of a relatively neutron permeable material such as aluminum. The tank 142 is supported on a concrete foundation fragmentarily indicated at 150 and forming part of a vault or chamber (not shown) enclosing the reactor and containing a shield (not shown) of material such as water or lead particularly adapted to absorb emanations from the reactive composition within the tank.

The reactive composition within the tank 142 comprises a body 152 of fluid neutron moderator such as heavy water, and a plurality of uranium rods 154 (Fig. 8) each being contained within a stainless steel tube 156 extending through the tank 142 and supported by the end walls 159 thereof and also by stainless steel or aluminum diaphragms 160, said moderator being admitted to the tank 142 through an inlet pipe 162 and being drained from the tank by an outlet pipe 164. If desired, the moderator may be circulated through the tank by a system (not shown) connected to the inlet and outlet pipes 162 and 164, said system preferably comprising conventional heat exchange means (not shown).

It may be noted that a reflector 166 is disposed within the outer chamber 148, said reflector being preferably composed of blocks of neutron moderator such as graphite and functioning to increase the neutron reproduction ratio of the reactor 102 by reducing neutron losses from the periphery thereof.

As shown in considerable detail in Fig. 6, the before-mentioned inlet pipe 104 is in the form of a header comprising a plurality of branch pipes 167 communicating with an inlet chamber 168 within which are disposed the inlet ends of the before-mentioned tubes 156, the outlet ends of said tubes communicating with an outlet chamber 170 which is connected to branch pipes 172 of the before-mentioned outlet pipe 120. Thus, it will be understood that fluid entering the reactor 102 through the inlet pipe 104 passes through the inlet chamber 168 and thence through the tubes 156, each of which is provided with inwardly extending projections or ribs 174 (Fig. 8) functioning to position the associated uranium rod 154 centrally of the tube thereby providing a substantially annular passage 176 therearound. It may also be noted that the rod 154 has a plurality of passages 178 extending lengthwise therethrough, whereby fluid passing through each tube 156 flows not only through the passage 176 therein but also through the passages 178 of the associated rod 154. The fluid passes outwardly from the tubes 156 through the outlet chamber 170 and thence through the before-mentioned outlet line 120 and into the before-mentioned valve 122.

The neutronic reaction within the reactor 102 is controlled by a control rod 180 (Fig. 7) of neutron absorbent material such as cadmium, said rod 180 being inserted into the reactor 102 through an aluminum tube or well 182 and functioning to regulate the neutron density within the reactor 102 as described in detail in the first-mentioned copending application. It will be understood that in actual practice, several rods 180 are used to control the reaction; however, for the purpose of clarity, only one of these rods is herein illustrated.

Figure 9:
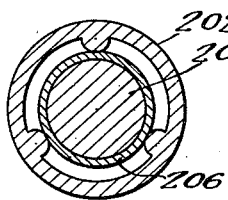
Figs. 9 and 10 are sectional views comparable to Fig. 8 but illustrating modifications of the structure shown therein.

Fig. 9 is a sectional view corresponding to Fig. 8 and illustrating a modification of the uranium rod. In this figure, the stainless steel tube is designated 202 and is identical with the before-mentioned tube 156. The uranium rod 204 illustrated in Fig. 9 is a solid member entirely enclosed within a jacket or coating 206 of a neutron permeable material, such as aluminum. Thus, the arrangement shown in this figure is particularly adapted to accommodate circulation of a liquid coolant such as ordinary water through the tube 202 during the neutronic reaction, the jacket 206 functioning to prevent corrosion of the uranium rod 204. In dissolving the rod 204 after termination of the reaction, it is necessary, until the jacket 206 is dissolved, to mix mercury with the nitric acid solvent, as above mentioned, thus affording a catalyst which causes the aluminum jacket 206 to be dissolved, whereupon the nitric acid rapidly dissolves the uranium rod 204.

In the event that it is desired to oxidize the rod 204 prior to dissolving the same, the above-mentioned oxidation processes will oxidize the aluminum jacket 206 as well as the uranium rod 204.

Figure 10:
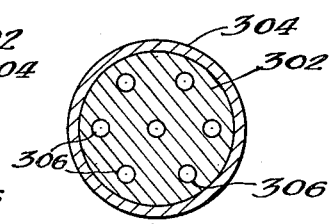

Fig. 10 is a sectional view illustrating a further modification of the structure shown in Figs. 6 to 8, and it will be noted that in Fig. 10, the uranium rod is designated 302 and is fitted within the stainless steel tube 304, said rod being provided with a plurality of passages 306 extending lengthwise therethrough to accommodate flow of fluid through the tube 304.

Figure 11:
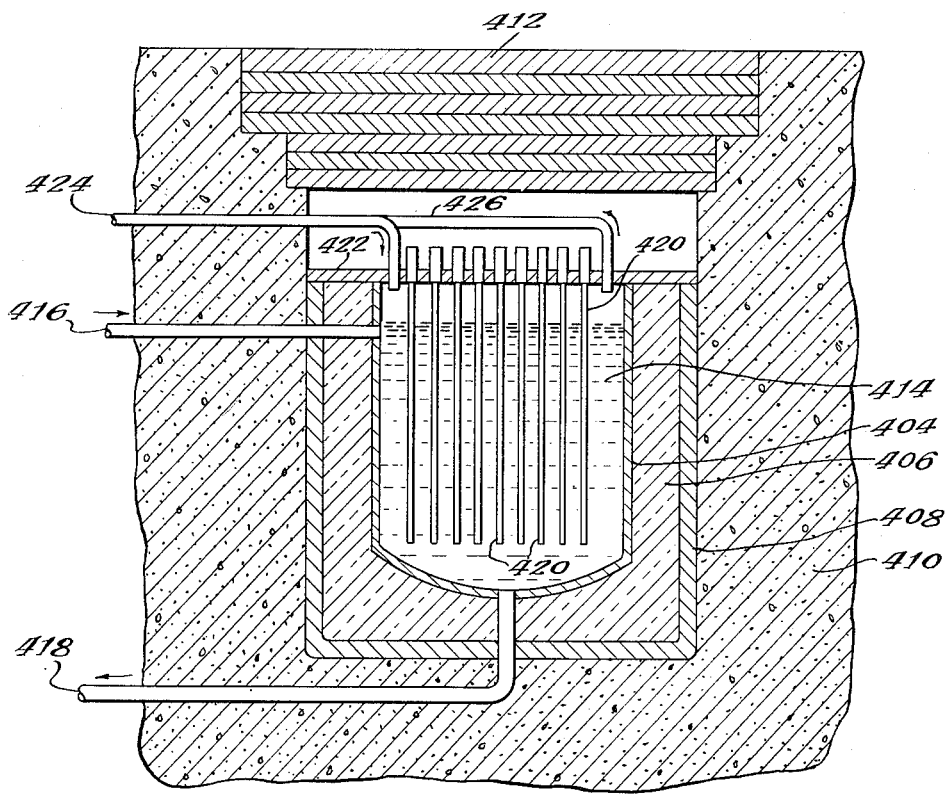
Fig. 11 is a vertical sectional view through a still different neutronic reactor to which the invention is applied.

Referring now to Fig. 11, there is shown a still different form of neutronic reactor to which the invention may be applied, said reactor comprising a stainless steel reactor tank 404 disposed within a neutron reflector 406, preferably composed of graphite blocks, said reflector being in turn disposed within an iron or steel container 408 contained within a concrete vault 410 adapted to absorb emanations from the reactor. The top of the vault is closed by a biological shield 412 preferably composed of alternate layers of iron and "masonite," said shield also being adapted to absorb emanations from the reactor. Contained within the reactor tank 404 is a body 414 of fluid neutron moderator such as heavy water, and said moderator is circulated through the tank 404 by inlet and outlet pipes 416 and 418, said pipes preferably forming part of a system (not shown) including heat exchange means for cooling the heavy water.

Fissionable material in the form of elongated aluminum jacketed uranium rods 420 is supported within the tank 404 by a lead cover 422 thereon.

It will be understood that the rods 420 and the neutron moderator 414 form a reactive composition capable of sustaining a nuclear fission chain reaction, said reaction being regulated by any suitable control means (not shown), such as a control rod, as more fully described in the first-mentioned copending application.

Some of the heavy water moderator is continuously decomposed into deuterium and oxygen as the result of neutron bombardment, and these gases as well as gaseous fission products of the reaction are swept from the tank 404 by an inert gas, such as helium passed through the tanks by means of inlet and outlet pipes 424 and 426, said pipes preferably forming part of a system (not shown) for recombining the deuterium and oxygen to form heavy water or deuterium oxide which is returned to the tank 404 by the moderator inlet pipe 416.

The reactor shown in Fig. 11 is preferably so constructed as to operate at a power value of $10^6$ kw., and is operated at that value for approximately 6 months, for example, whereupon the reaction is terminated. After termination of the reaction and preferably approximately one month subsequent thereto, the moderator 414 is withdrawn from the tank 404 through the outlet pipe 418; and a solvent, such as nitric acid, is admitted to the tank, said solvent containing a suitable quantity of mercury to afford a catalyst whereby the aluminum jackets on the rods 420 are dissolved whereupon the rods are dissolved in the nitric acid. After the rods 420 have been dissolved, the solution is withdrawn from the tank 404 through the outlet line 418 and is stored in a tank pending treatment to recover element 94 and fission products of the reaction.

If desired, the rods 420, as well as their jackets, may be oxidized by any of the above-mentioned processes, prior to dissolving said rods.

While the theory of the nuclear chain fission mechanism in uranium set forth herein is based on the best presently known experimental evidence, the invention is not limited thereto, as additional experimental data later discovered may modify the theory disclosed. Any such modification of theory, however, will in no way affect the results to be obtained in the practice of the invention herein described and claimed.

Obviously, many modifications may be made in the specific embodiments disclosed without departing from the intended scope of the invention.

What is claimed is:

In a method of unloading a neutronic reactor containing uranium metal as the fissionable material, the improvement which consists of passing steam and hydrogen in contact with the uranium metal in the reactor to oxidize the uranium metal to uranium oxide, then dissolving the uranium oxide in situ with nitric acid, and removing the solution from the reactor.

References Cited in the file of this patent

UNITED STATES PATENTS

| 357,860 | Sawyer | Feb. 15, 1887 |
| 1,050,678 | Moreno | Jan. 14, 1913 |

FOREIGN PATENTS

| 233,011 | Switzerland | Oct. 2, 1944 |

OTHER REFERENCES

Mellor, "Treatise on Inorganic and Theoretical Chemistry," vol. 12, page 117, Longmans, Green & Co. (1932).

Smyth, "Atomic Energy for Military Purposes," page 103, August 1945.

Business Week, Sept. 1, 1945, pages 62, 63.

Kelly et al.: Physical Review 73, 1135–9 (1948).